(12) United States Patent
Govari et al.

(10) Patent No.: US 12,533,072 B2
(45) Date of Patent: Jan. 27, 2026

(54) FINDING A CARDIAC LINE OF BLOCK USING STATISTICAL ANALYSIS OF ACTIVATION WAVE VELOCITY

(71) Applicant: BIOSENSE WEBSTER (ISRAEL) LTD., Yokneam (IL)

(72) Inventors: Assaf Govari, Haifa (IL); Vadim Gliner, Haifa (IL); Andres Claudio Altmann, Haifa (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 518 days.

(21) Appl. No.: 17/481,616

(22) Filed: Sep. 22, 2021

(65) Prior Publication Data
US 2023/0093600 A1    Mar. 23, 2023

(51) Int. Cl.
*A61B 5/367*    (2021.01)
*A61B 5/339*    (2021.01)

(52) U.S. Cl.
CPC ............ *A61B 5/367* (2021.01); *A61B 5/339* (2021.01)

(58) Field of Classification Search
CPC ...................................... A61B 5/367
USPC ........................................ 600/523
See application file for complete search history.

(56) References Cited

U.S. PATENT DOCUMENTS

| | | | |
|---|---|---|---|
| 8,456,182 B2 | 6/2013 | Bar-Tal et al. | |
| 2003/0023130 A1 | 1/2003 | Ciaccio | |
| 2004/0176697 A1 | 9/2004 | Kappenberger | |
| 2015/0065836 A1* | 3/2015 | Thakur | A61B 5/287 600/374 |
| 2015/0317448 A1* | 11/2015 | Razavi | A61B 5/283 702/19 |
| 2018/0296111 A1* | 10/2018 | Deno | A61B 5/746 |
| 2019/0328258 A1 | 10/2019 | Gaeta | |
| 2020/0146572 A1 | 5/2020 | Bar-Tal | |
| 2020/0146579 A1 | 5/2020 | Bar-Tal et al. | |
| 2021/0038314 A1 | 2/2021 | Wibowo | |
| 2021/0093217 A1 | 4/2021 | Shariat | |

FOREIGN PATENT DOCUMENTS

WO    WO-03011112 A2 *  2/2003  ......... A61B 18/1492
WO       2020214439 A1   10/2020

OTHER PUBLICATIONS

European Search Report for corresponding EPA No. 22196750.8 dated Mar. 9, 2023.

* cited by examiner

*Primary Examiner* — Nicole F Johnson

(57) ABSTRACT

A method includes receiving a set of data points including positions and respective velocities of an activation wave in a tissue region of a cardiac chamber. The set is partitioned into at least two velocity clusters, each velocity cluster characterized by a respective velocity of the activation wave. One or more border curves are estimated, between the at least two clusters. The one or more border curves are indicated to a user as possible lines of block of the activation wave.

14 Claims, 3 Drawing Sheets

FINDING A CARDIAC LINE OF BLOCK USING STATISTICAL ANALYSIS OF ACTIVATION WAVE VELOCITY

FIELD OF THE INVENTION

The present invention relates generally to electrophysiological (EP) mapping, and particularly to analysis of cardiac EP maps.

BACKGROUND OF THE INVENTION

Methods for assisting the analysis of electrophysiologically mapped cardiac tissue were previously proposed in the patent literature. For example, U.S. Patent Application Publication No. 2021/0093217 describes a method for generating propagation and velocity maps for cardiac wavefront propagation including cardiac arrhythmia, sinus rhythm, and paced rhythm. Activation time information is generated in the absence of any time alignment reference, wherein an estimated activation time is a weighted summation of potentially nonlinear and nonorthogonal candidate functions (CFs) selected from a bank of CFs. Time alignments between sequential recordings may be done by including binary level functions among selected CFs. Embodiments are applicable to single catheter mapping and sequential mapping, and are robust as confirmed by the ability to generate propagation maps and conduction velocity in the presence of multiple colliding wavefronts. The propagation and conduction velocity maps may be used for one or more of diagnosing cardiac arrhythmia, localizing cardiac arrhythmia, guiding catheter ablation therapy of cardiac arrhythmia, and guiding cardiac pacing therapy.

As another example, U.S. Patent Application Publication No. 2004/0176697 describes an analysis of electrocardiograms (ECGs) during atrial fibrillation. In particular, the invention relates to the use of such methods for the creation and validation of cardiac models and use in the refined diagnosis of heart disease. Classification of the atrial fibrillation of a given patient or group of patients is performed using an auto regressive (AR) model coefficients subjected to a mathematical cluster analysis, including hierarchical methods (e.g., single linkage, average linkage (weighted and unweighted), centroid, median and complete linkage) and non-hierarchical methods (e.g., the k-means clustering algorithm, adaptive k-means, k-medoids, and fuzzy clustering).

SUMMARY OF THE INVENTION

An embodiment of the present invention provides a method including receiving a set of data points including positions and respective velocities of an activation wave in a tissue region of a cardiac chamber. The set is partitioned into at least two velocity clusters, each velocity cluster characterized by a respective velocity of the activation wave. One or more border curves are estimated, between the at least two clusters. The one or more border curves are indicated to a user as possible lines of block of the activation wave.

In some embodiments, partitioning the set includes applying a k-means clustering process.

In some embodiments, partitioning the set includes partitioning the set based on magnitudes of the velocities. In other embodiments, partitioning the set includes partitioning the set based on directions of the velocities.

In an embodiment, estimating the border curves includes identifying a discontinuity in the velocities between different clusters.

In another embodiment, indicating the one or more border curves to a user includes overlaying the one or more border curves on a surface representation of the cardiac chamber.

In some embodiments, the surface representation is at least part of an activation wave velocity map.

In some embodiments, the method further includes overlaying activation times on the surface representation.

There is additionally provided, in accordance with an embodiment of the present invention, a system including an interface and a processor. The interface is configured to receive a set of data points including positions and respective velocities of an activation wave in a tissue region of a cardiac chamber. The processor is configured to (i) partition the set into at least two velocity clusters, each velocity cluster characterized by a respective velocity of the activation wave, (ii) estimate one or more border curves between the at least two clusters, and (iii) indicate the one or more border curves to a user as possible lines of block of the activation wave.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Overview

Figure 1:
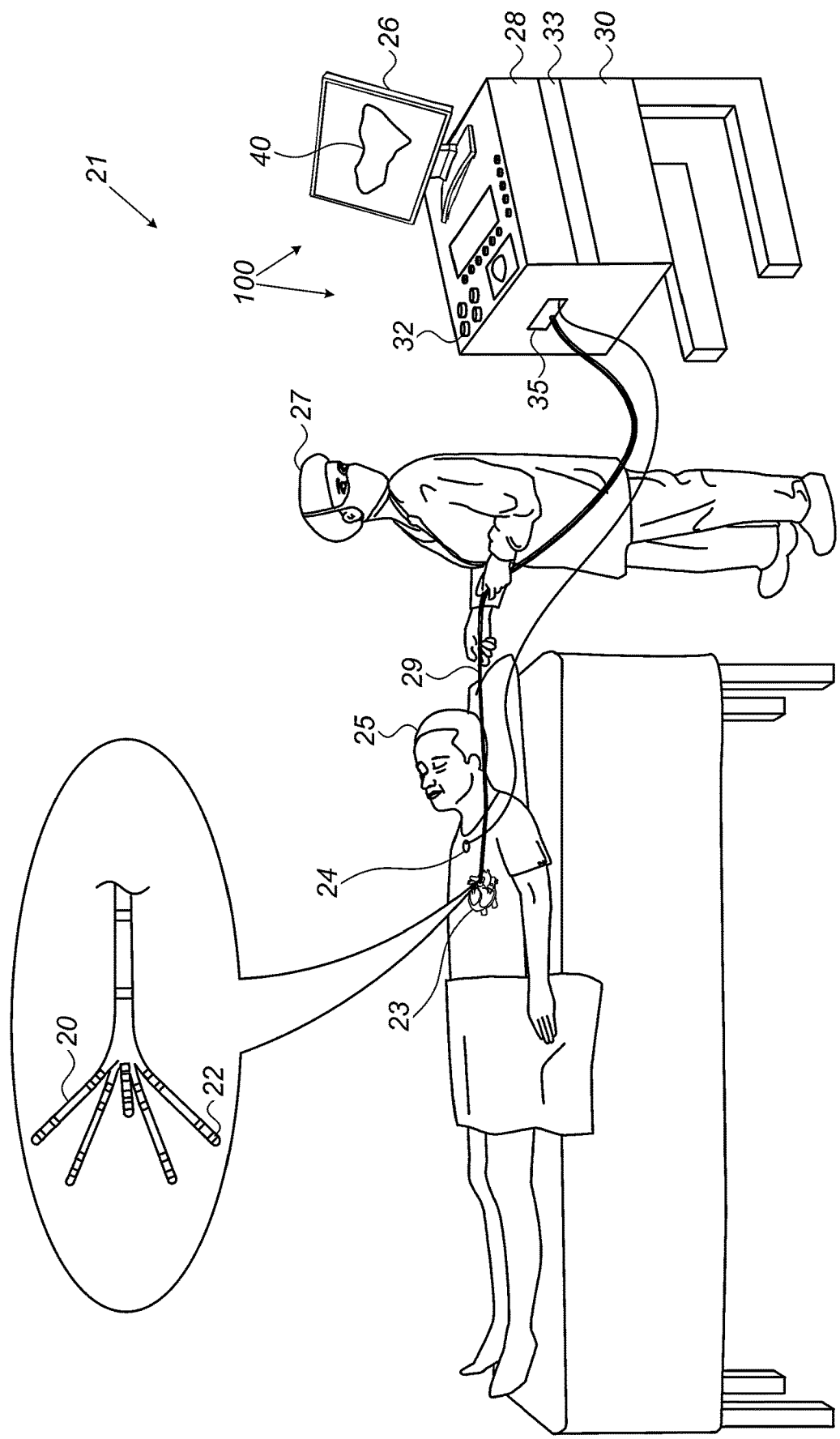
FIG. 1 is a schematic, pictorial illustration of a system for electrophysiological (EP) mapping and ablation, in accordance with an exemplary embodiment of the present invention.

The electrical activity of tissue of an organ of a patient, such as a cardiac chamber, can be mapped using a mapping catheter (e.g., electrophysiologically mapped) having suitable electrodes fitted at its distal end for mapping within the organ and an EP mapping system that acquires and analyzes signals output by the catheter.

For example, in order to understand propagation of an impulse of cardiac electrical activity, a physician needs to know the local wave velocity. Such a propagation can be graphically encoded on a surface representation of the cardiac chamber to form an EP map showing activation wave velocity.

One possible use of a velocity map is to assist in determining an outcome of an ablation treatment of an arrhythmia, which aims at eliminating abnormal wave propagation in tissue regions of the heart. The ablated tissue is typically along a curve, which forms what is termed as a "blocking line" that blocks propagation of the activation wave.

Activation wave velocities in the heart may be displayed as arrows having directions and magnitudes. In the description that follows, the term "velocity" refers to a vector having both magnitude and direction, and the term "speed" refers to the magnitude of the velocity. In a mapped cardiac region including an expected blocking line (typically after the ablation procedure) the arrows on the map are expected to have some distinct pattern, and, in this case, the blocking line would be apparent from the arrows. In practice, however, there is considerable noise in the wave velocity measurement, so that a blocking line is not apparent from a simple wave velocity presentation.

Embodiments of the present invention that are described hereinafter apply statistical methods, such as k-means clustering, to the calculated wave velocities in a selected cardiac region being inspected so as to identify and plot a blocking line.

In one exemplary embodiment, a processor runs a clustering algorithm over a memory-stored set of mapped activation wave velocities. The clustering algorithm assumes that the wave velocities are partitioned into two clusters (i.e., k=2). In an iterative process, the partition is optimized to distinguish the partition. At each iteration the mean of the wave velocities, as well as the variance of the mean, is calculated in each partition. The iteration continues until the two variances are minimized. At this point the iteration halts, and the partition is assumed to correspond to the blocking line (i.e., to a discontinuity line in wave velocities. In one case, the discontinuity is in wave speed with wave directions being within a predefined tolerance. In another case, the discontinuity is in wave direction, with wave directions being changed by at least a minimum angle a predefined value, such as 20 degrees. The partition line is then drawn on the activation wave velocity map as a blocking line.

In an exemplary embodiment, a processor, such as the processor of the EP mapping system, runs the disclosed algorithm to find a blocking line in real time, so that, for example, during an ablation procedure a physician can estimate the accuracy and efficacy of the ablation. In some exemplary embodiments different catheters are inserted at a same time for mapping and ablations, whereas in other exemplary embodiments, the same catheter is used for both ablation and mapping.

System Description

FIG. 1 is a schematic, pictorial illustration of a system 21 for electrophysiological (EP) mapping and ablation, in accordance with an exemplary embodiment of the present invention. FIG. 1 depicts a physician 27 using a Pentaray® EP mapping catheter 29 to perform an EP mapping of a heart 23 of a patient 25. Catheter 29 comprises, at its distal end, one or more arms 20, which may be mechanically flexible, each of which is coupled with one or more electrodes 22. During the mapping procedure, electrodes 22 acquire and/or inject unipolar and/or bipolar signals from and/or to the tissue of heart 23. Catheter 29 may be further used to perform an ablation, such as a radiofrequency (RF) or irreversible electroporation (IRE).

A processor 28 in a console 30 receives these signals via an electrical interface 35, and uses information contained in these signals to construct an EP map 40 that processor 28 stores in a memory 33. During and/or following the procedure, processor 28 may display EP map 40 (e.g., an activation wave velocity map, such the map shown in FIG. 3) on a display 26. Using the disclosed technique, processor 28 identifies and overlays one or more blocking lines on the wave velocity map to assist physician 27 in estimating accuracy and efficacy of a performed ablation (e.g., RF ablation). Based on the information, physician 27 may, for example, perform additional ablations.

User controls 32 of a user interface 100 enable physician 27 to inspect map 40. Controls 32 may include, for example, a trackball and control knobs, as well as a keyboard. Other elements of user interface 100 may include touch screen functionality of display 26.

During the procedure, a tracking system is used to track the respective locations of sensing-electrodes 22, such that each of the signals (and eventually wave velocities) may be associated with the location at which the signal was acquired. For example, the Active Current Location (ACL) system, made by Biosense-Webster (Irvine Calif.), which is described in U.S. Pat. No. 8,456,182, whose disclosure is incorporated herein by reference, may be used. In the ACL system, a processor estimates the respective locations of the electrodes based on impedances measured between each of the sensing electrodes 22, and a plurality of surface electrodes 24, that are coupled to the skin of patient 25. For example, three surface electrodes 24 may be coupled to the patient's chest, and another three surface electrodes may be coupled to the patient's back. For ease of illustration, only one surface electrode is shown in FIG. 1. Electric currents are passed between electrodes 22 inside heart 23 of the patient and surface electrodes 24. Processor 28 calculates an estimated location of all electrodes 22 within the patient's heart based on the ratios between the resulting current amplitudes measured at surface electrodes 24 (or between the impedances implied by these amplitudes) and the known positions of electrodes 24 on the patient's body. The processor may thus associate any given impedance signal received from electrodes 22 with the location at which the signal was acquired.

The example illustration shown in FIG. 1 is chosen purely for the sake of conceptual clarity. Other tracking methods can be used, such as those based on measuring voltage signals. Other types of sensing and ablation catheters, such as the Lasso® Catheter (produced by Biosense Webster) may equivalently be employed. Contact sensors may be fitted at the distal end of EP mapping catheter 29. As noted above, at least some sensing electrodes of any catheter may also be used to perform ablation, and may be utilized in a similar way and fitted to electrodes 22 for acquiring the needed position data. Thus, a sensing electrode used for collecting position and activation data can be also regarded, in this case, as an ablation electrode. In an optional embodiment, processor 28 is further configured to indicate the quality of physical contact between each of the electrodes 22 and an inner surface of the cardiac chamber during measurement.

Processor 28 typically comprises a general-purpose computer with software programmed to carry out the functions described herein. In particular, processor 28 runs a dedicated algorithm as disclosed herein, included in FIG. 4, that enables processor 28 to perform the disclosed steps, as further described below. The software may be downloaded to the computer in electronic form, over a network, for example, or it may, alternatively or additionally, be provided and/or stored on non-transitory tangible media, such as magnetic, optical, or electronic memory.

Finding a Cardiac Blocking Line Using K-Means Clustering

Figure 2:
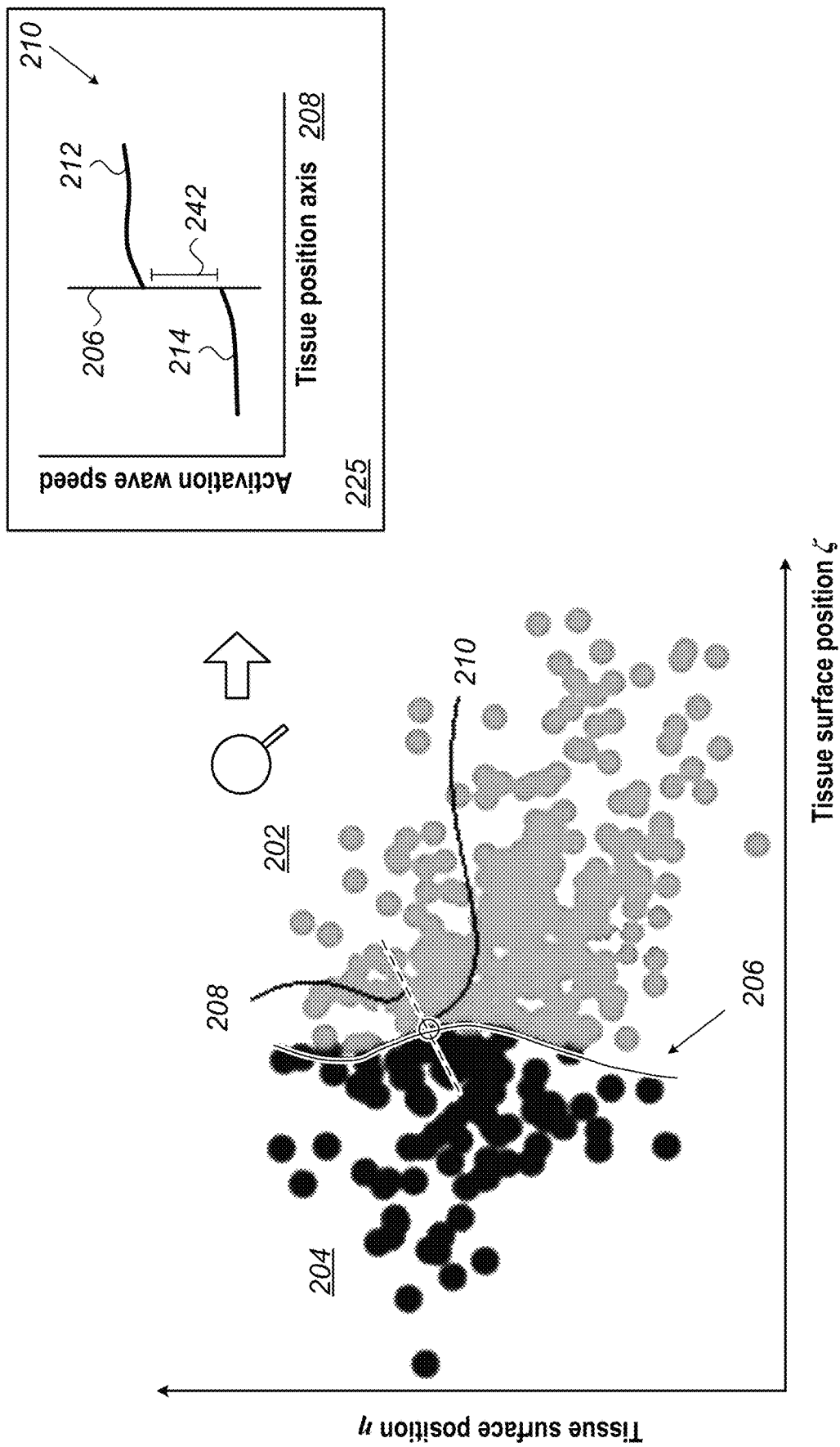
FIG. 2 is a schematic plot showing a use of the k-means method to identify discontinuity in activation speeds and to identify a blocking line of an activation wave, in accordance with an exemplary embodiment of the present invention.

FIG. 2 is a schematic plot showing a use of the k-means method for identifying a discontinuity 242 in activation speeds to identify a blocking line 206 of an activation wave, in accordance with an exemplary embodiment of the present invention. While the illustrated exemplary embodiment refers to a discontinuity in activation speeds, in another exemplary embodiment the discontinuity can be manifested by a deflection angle of the wave that exceeds a specified boundary (e.g., at least 20 degrees).

As seen, a set of velocity wave magnitude data points is partitioned into two clusters, 202 and 204, with each cluster indicating different speeds, but similar direction of propagation, within a predefined allowable range of direction, such as within one standard deviation in wave direction distribution. The horizontal and vertical plot axes are the tissue surface position coordinates of the data points, representing a surface of a cardiac camber region. Using the k-means method, a processor estimates a border curve 206 between the activation wave speed clusters 202 and 204.

The discontinuity in wave speed can be plotted by drawing a normal line 208 to curve 206 at a small ROI 210. Using normal line 208 as a tissue position axis, inset 225 shows a schematic (e.g., averaged and smoothed) speed profile 212 of data points of cluster 202 and a schematic speed profile 214 of data points of cluster 204 over axis 208 within ROI 210. As seen, at discontinuity border 206, a speed gap occurs with a size 242.

The gap in activation speed is indicative of a blocking point of the activation wave along axis 208. As this largely holds for any ROI 210 on curve 206, the curve represents a possible blocking line of an activation wave.

Figure 3:
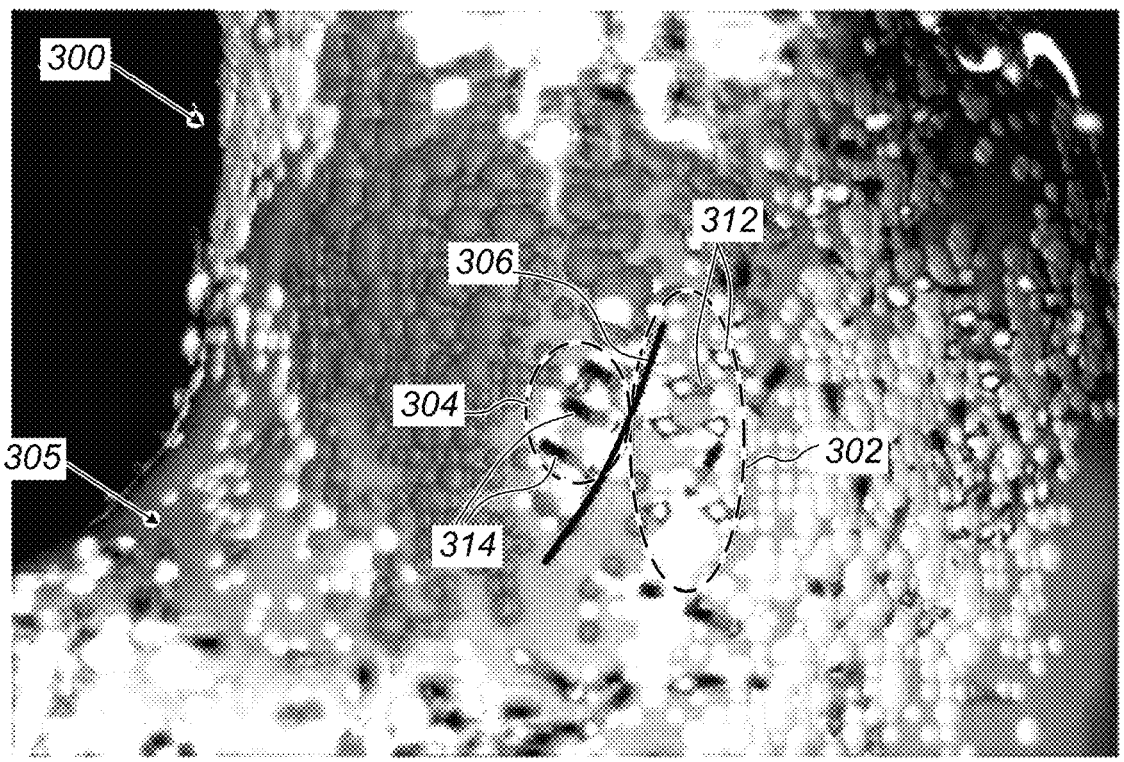
FIG. 3 is a schematic, pictorial illustration of an activation wave velocity map showing a blocking line of an activation wave overlaid on a surface representation of a left ventricle, in accordance with an exemplary embodiment of the present invention.

FIG. 3 is a schematic, pictorial illustration of an activation wave velocity map 300 showing a blocking line 306 of the activation wave overlaid on a surface representation 305 of a left ventricle, in accordance with an exemplary embodiment of the present invention.

As seen, curve 306 separates two clusters of arrows (i.e., velocity vectors). Velocity vectors 314 in cluster 304 have a similar direction to velocity vectors 312 in cluster 302. Using the method described with respect to FIG. 2 above and with respect to FIG. 4 below, the two clusters of wave velocity data points are distinguished by curve 306, which is indicated on map 300 as a possible blocking line of the activation wave represented by the different velocity vectors that are overlaid on the map.

As further seen, it is very difficult to visually identify any blocking line on the map without curve 306 being derived and overlaid using the disclosed technique. A user who receives map 300 with the possible blocking line of the activation wave indicated, can estimate, for example, if a performed ablation that caused the blocking line is sufficient.

A Method of Finding a Cardiac Blocking Line Using Activation Wave Velocity

Figure 4:
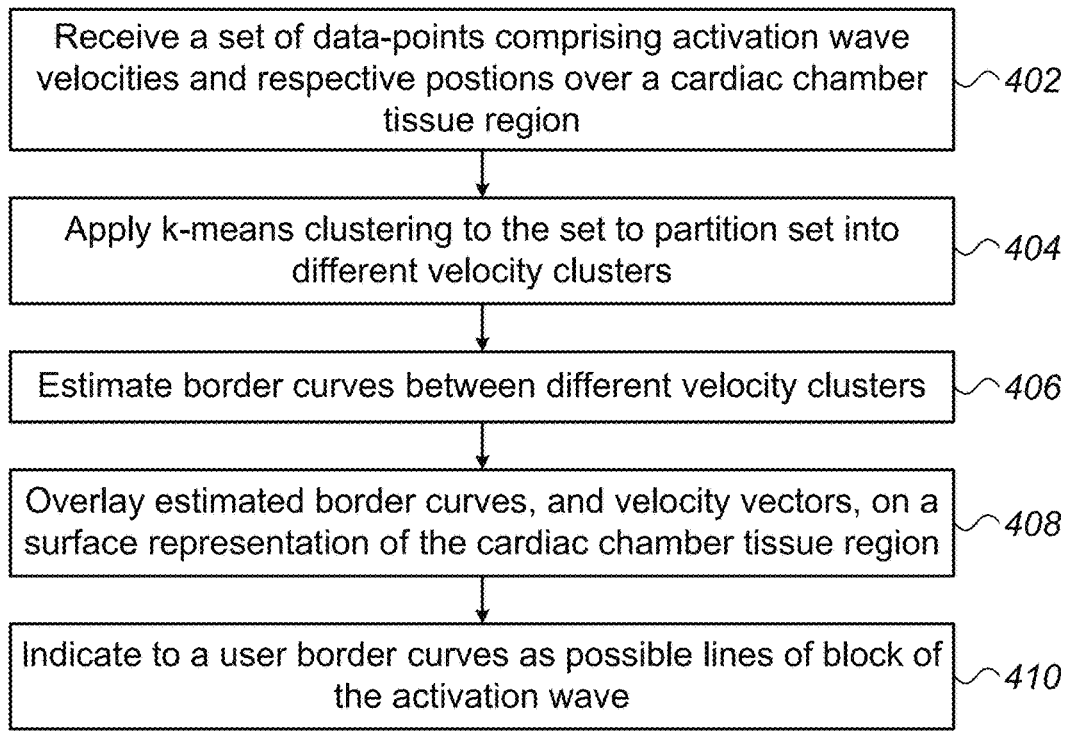
FIG. 4 is a flow chart that schematically illustrates a method for identifying and presenting a blocking line of an activation wave on the surface representation of FIG. 3, in accordance with an exemplary embodiment of the present invention.

FIG. 4 is a flow chart that schematically illustrates a method for identifying and presenting blocking line 306 of an activation wave on the surface representation 305 of FIG. 3, in accordance with an exemplary embodiment of the present invention. The algorithm, according to the presented exemplary embodiment, carries out a process that begins when processor 28 receives a set of data points comprising positions and respective velocities of an activation wave in a cardiac chamber tissue region, at a cardiac EP data receiving step 402.

Next, the processor applies a k-means iterative statistical calculation to partition the set into at least two clusters, based on similar velocity in each cluster, at a data clustering step 404.

In an estimation step 406, the processor estimates one or more border curves between at least two clusters. The processor overlays the estimated border curves (e.g., curve 306) on surface representation (e.g., map 300) of the cardiac chamber, at a curve overlaying step 408. This step may include overlaying data points in the form of propagation vectors, as seen in clusters 302 and 304 of FIG. 3.

Finally, at an indication step 410, processor 28 indicates to a user, such as physician 27, the possible border curves of one or more respective blocking lines of the activation wave.

The example flow chart shown in FIG. 4 is chosen purely for the sake of conceptual clarity. In optional embodiments, various additional steps may be performed, for example to automatically register additional layers, such as of activation times.

Although the embodiments described herein mainly address cardiac applications, the methods and systems described herein can also be used in other applications, such as in anatomical mapping electrical activity in the brain.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

We claim:

1. A method for finding a cardiac blocking line during an electrophysiological (EP) procedure, comprising:
    performing ablation of a tissue region in a cardiac chamber of a patient;
    placing at least one electrode in the cardiac chamber, the at least one electrode configured to acquire velocities of an activation wave in the tissue region of the cardiac chamber;
    acquiring, by the at least one electrode, a set of data points comprising positions and respective velocities of the activation wave in a the tissue region of a the cardiac chamber;
    partitioning the set into at least two velocity clusters, each velocity cluster characterized by a respective velocity of the activation wave, the partitioning comprises applying a k-means clustering process, the partitioning being iterative;
    calculating the mean of the velocities, as well as the variance of the mean, at each iteration of the partitioning;
    estimating one or more border curves between the at least two clusters of data points;
    constructing, by a processor, an EP map of the cardiac chamber based on the set of data points acquired by the at least one electrode;
    displaying to a user, on a display device, the EP map, the EP map including a representation of the tissue region; and
    indicating to the user, on the EP map, the one or more border curves as possible lines of block of the activation wave wherein the indicating is based on a discontinuity line in wave velocities and is configured to assist in cardiac ablation efficacy estimation.

2. The method according to claim 1, wherein partitioning the set comprises partitioning the set based on magnitudes of the velocities.

3. The method according to claim 1, wherein partitioning the set comprises partitioning the set based on directions of the velocities.

4. The method according to claim 1, wherein estimating the border curves comprises identifying a discontinuity in the velocities between different clusters.

5. The method according to claim 1, wherein indicating the one or more border curves to a user comprises overlaying the one or more border curves on a surface representation of the cardiac chamber.

6. The method according to claim 5, wherein the surface representation is at least part of an activation wave velocity map.

7. The method according to claim 5, and comprising overlaying activation times on the surface representation.

8. A system for finding a cardiac blocking line during an electrophysiological (EP) procedure, comprising:
at least one electrode configured to be inserted into a cardiac chamber of a patient, the at least one electrode configured to acquire velocities of an activation wave in a tissue region of the cardiac chamber, after the tissue region has been ablated;
an interface configured to acquire, by the at least one electrode, a set of data points comprising positions and respective velocities of an activation wave in a the tissue region of a cardiac chamber; and
a processor, which is configured to:
partition the set into at least two velocity clusters, by applying a k-means clustering process, each velocity cluster characterized by a respective velocity of the activation wave, the partitioning being iterative;
calculate the mean of the velocities, as well as the variance of the mean, at each iteration of the partitioning;
estimate one or more border curves between the at least two clusters of data points;
construct an EP map of the cardiac chamber based on the set of data points acquired by the at least one electrode;
display to a user, on a display device, the EP map, the EP map including a representation of the tissue region; and
indicate to the user, on the EP map, the one or more border curves as possible lines of block of the activation wave, the indicating is based on a discontinuity line in wave velocities and, the indicating is configured to assist in cardiac ablation efficacy estimation.

9. The system according to claim 8, wherein the processor is configured to partition the set based on magnitudes of the velocities.

10. The system according to claim 8, wherein the processor is configured to partition the set based on directions of the velocities.

11. The system according to claim 8, wherein the processor is configured to estimate the border curves by identifying a discontinuity in the velocities between different clusters.

12. The system according to claim 8, wherein the processor is configured to indicate the one or more border curves to a user by overlaying the one or more border curves on a surface representation of the cardiac chamber.

13. The system according to claim 12, wherein the surface representation is at least part of an activation wave velocity map.

14. The system according to claim 12, wherein the processor is further configured to overlay activation times on the surface representation.

* * * * *